(12) United States Patent
Karkow et al.

(10) Patent No.: US 9,377,190 B2
(45) Date of Patent: Jun. 28, 2016

(54) BURNER WITH A PERFORATED FLAME HOLDER AND PRE-HEAT APPARATUS

(71) Applicant: ClearSign Combustion Corporation, Seattle, WA (US)

(72) Inventors: Douglas W. Karkow, Des Moines, WA (US); Joseph Colannino, Bellevue, WA (US); Igor A. Krichtafovitch, Kirkland, WA (US); Christopher A. Wiklof, Everett, WA (US)

(73) Assignee: CLEARSIGN COMBUSTION CORPORATION, Seattle, WA (US)

( * ) Notice: Subject to any disclaimer, the term of this patent is extended or adjusted under 35 U.S.C. 154(b) by 0 days.

(21) Appl. No.: 14/741,131

(22) Filed: Jun. 16, 2015

(65) Prior Publication Data
US 2015/0276212 A1 Oct. 1, 2015

Related U.S. Application Data

(63) Continuation of application No. PCT/US2014/016622, filed on Feb. 14, 2014.

(60) Provisional application No. 61/765,022, filed on Feb. 14, 2013, provisional application No. 61/931,407, filed on Jan. 24, 2014.

(51) Int. Cl.
*F23C 99/00* (2006.01)
*F23N 5/26* (2006.01)
(Continued)

(52) U.S. Cl.
CPC .............. *F23C 99/001* (2013.01); *F23C 6/042* (2013.01); *F23C 9/06* (2013.01); *F23D 11/02* (2013.01); *F23D 11/38* (2013.01); *F23D 11/383* (2013.01); *F23D 11/406* (2013.01); *F23D 11/446* (2013.01); *F23D 14/02* (2013.01);
(Continued)

(58) Field of Classification Search
CPC ........................................................ F23N 1/00
USPC ............................................ 431/75, 253, 328
See application file for complete search history.

(56) References Cited

U.S. PATENT DOCUMENTS

| 2,604,936 A | 7/1952 | Kaehni et al. |
| 3,306,338 A | 2/1967 | Wright et al. |

(Continued)

FOREIGN PATENT DOCUMENTS

| EP | 1139020 | 8/2006 |
| JP | 61-265404 | 11/1986 |

(Continued)

OTHER PUBLICATIONS

James Lawton et al., Electrical Aspects of Combustion, 1969, p. 81, Clarendon Press, Oxford, England.
(Continued)

*Primary Examiner* — Avinash Savani
(74) *Attorney, Agent, or Firm* — Christopher A. Wiklof; Nicholas S. Bromer; Launchpad IP, Inc.

(57) ABSTRACT

According to an embodiment, a combustion system is provided, which includes a nozzle configured to emit a diverging fuel flow, a flame holder positioned in the path of the fuel flow and that includes a plurality of apertures extending therethrough, and a preheat mechanism configured to heat the flame to a temperature exceeding a startup temperature threshold.

16 Claims, 14 Drawing Sheets

(51) Int. Cl.
| | | |
|---|---|---|
| *F27D 11/06* | (2006.01) | |
| *F23D 14/24* | (2006.01) | |
| *F23D 14/84* | (2006.01) | |
| *F23N 5/00* | (2006.01) | |
| *F23N 1/00* | (2006.01) | |
| *F23D 14/02* | (2006.01) | |
| *F23D 14/74* | (2006.01) | |
| *F23D 14/14* | (2006.01) | |
| *F23D 11/44* | (2006.01) | |
| *F23D 11/02* | (2006.01) | |
| *F23D 11/38* | (2006.01) | |
| *F23D 11/40* | (2006.01) | |
| *F23L 7/00* | (2006.01) | |
| *F23C 6/04* | (2006.01) | |
| *F23C 9/06* | (2006.01) | |
| *F23D 14/26* | (2006.01) | |
| *F23N 1/02* | (2006.01) | |

(52) U.S. Cl.
CPC ............... *F23D 14/14* (2013.01); *F23D 14/24* (2013.01); *F23D 14/26* (2013.01); *F23D 14/74* (2013.01); *F23D 14/84* (2013.01); *F23L 7/007* (2013.01); *F23N 1/00* (2013.01); *F23N 1/002* (2013.01); *F23N 1/02* (2013.01); *F23N 5/00* (2013.01); *F23N 5/265* (2013.01); *F27D 11/06* (2013.01); *F23C 2201/00* (2013.01); *F23C 2900/00* (2013.01); *F23D 2203/102* (2013.01); *F23D 2203/104* (2013.01); *F23D 2207/00* (2013.01); *F23N 2021/00* (2013.01); *F23N 2027/22* (2013.01); *F23N 2900/00* (2013.01); *Y02T 50/677* (2013.01)

(56) References Cited

U.S. PATENT DOCUMENTS

| | | | |
|---|---|---|---|
| 3,358,731 A | 12/1967 | Donnelly | |
| 3,416,870 A | 12/1968 | Wright | |
| 3,720,188 A * | 3/1973 | Mead | F22B 27/165 122/41 |
| 4,020,388 A | 4/1977 | Pratt, Jr. | |
| 4,021,188 A | 5/1977 | Yamagishi et al. | |
| 4,081,958 A | 4/1978 | Schlep | |
| 4,111,636 A | 9/1978 | Goldberg | |
| 4,392,813 A * | 7/1983 | Tanaka | F23N 5/006 431/201 |
| 4,588,373 A * | 5/1986 | Tonon | F24C 3/14 126/39 J |
| 4,757,788 A * | 7/1988 | Simons | F02P 3/04 123/145 A |
| 5,275,552 A | 1/1994 | Schwartz et al. | |
| 5,470,222 A | 11/1995 | Holowczak et al. | |
| 5,515,681 A | 5/1996 | DeFreitas | |
| 5,667,374 A | 9/1997 | Nutcher et al. | |
| 5,713,206 A | 2/1998 | McWhirter et al. | |
| 5,718,573 A | 2/1998 | Knight et al. | |
| 5,846,067 A | 12/1998 | Nishiyama et al. | |
| 7,137,808 B2 | 11/2006 | Branston et al. | |
| 7,243,496 B2 | 7/2007 | Pavlik et al. | |
| 7,523,603 B2 | 4/2009 | Hagen et al. | |
| 8,245,951 B2 | 8/2012 | Fink et al. | |
| 2002/0155403 A1 | 10/2002 | Griffen et al. | |
| 2004/0058290 A1 | 3/2004 | Mauzey et al. | |
| 2004/0197719 A1 | 10/2004 | Chung et al. | |
| 2005/0208442 A1 | 9/2005 | Heiligers et al. | |
| 2007/0020567 A1 | 1/2007 | Branston et al. | |
| 2008/0145802 A1 | 6/2008 | Hammer et al. | |
| 2011/0027734 A1 | 2/2011 | Hartwick et al. | |
| 2011/0076628 A1 | 3/2011 | Miura et al. | |
| 2011/0203771 A1 | 8/2011 | Goodson et al. | |
| 2013/0004902 A1 | 1/2013 | Goodson et al. | |
| 2013/0071794 A1 | 3/2013 | Colannino et al. | |
| 2013/0170090 A1 | 7/2013 | Colannino et al. | |

FOREIGN PATENT DOCUMENTS

| | | |
|---|---|---|
| JP | 06-026624 | 2/1994 |
| JP | 07-083076 | 3/1995 |
| JP | 2006-275482 | 10/2006 |
| WO | WO 96/01394 | 1/1996 |
| WO | WO 2013/181569 | 12/2013 |
| WO | WO 2014/127305 | 8/2014 |
| WO | WO 2014/127306 | 8/2014 |
| WO | WO 2014/127307 | 8/2014 |
| WO | WO 2014/127311 | 8/2014 |

OTHER PUBLICATIONS

Timothy J.C. Dolmansley et al., Electrical Modification of Combustion and the Affect of Electrode Geometry on the Field Produced, Modelling and Simulation in Engineering, May 26, 2011, 1-13, vol. 2011, Himdawi Publishing Corporation.

F. Altendorfner et al., Electric Field Effects on Emissions and Flame Stability with Optimized Electric Field Geometry, The European Combustion Meeting ECM 2007, 2007, 1-6, Germany.

M. Abdul Mujeebu et al., Applications of Porous Media Combustion Technology—A Review, Applied Energy, 2009, 1365-1375, Great Britain.

PCT International Search Report and Written Opinion of PCT/US2014/016632 mailed May 26, 2014.

PCT International Search Report and Written Opinion of PCT/US2014/016628 mailed May 27, 2014.

PCT International Search Report and Written Opinion of PCT/US2014/016622 mailed May 27, 2014.

PCT International Search Report and Written Opinion of PCT/US2014/016626 mailed Jun. 3, 2014.

* cited by examiner

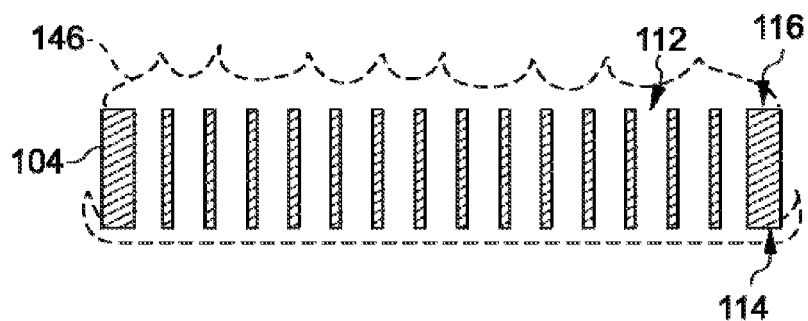
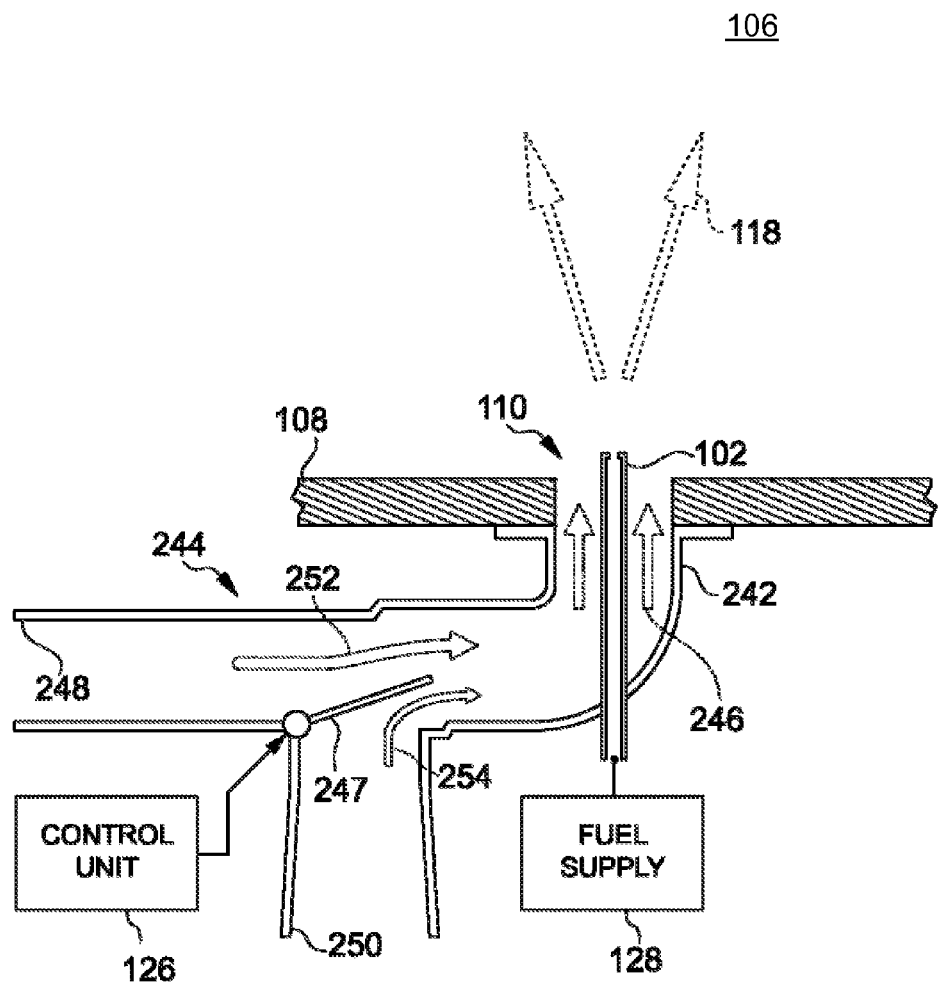

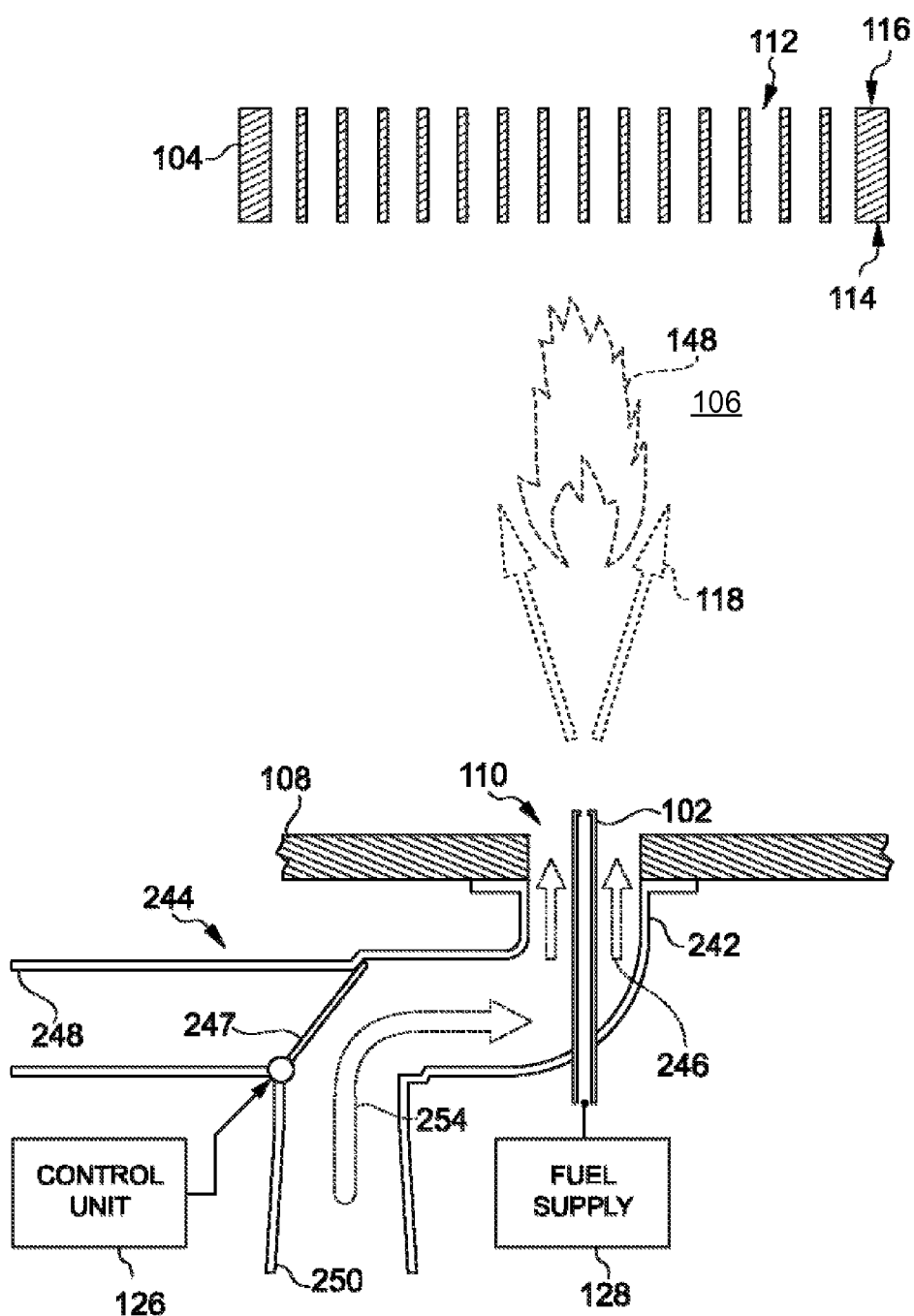

BURNER WITH A PERFORATED FLAME HOLDER AND PRE-HEAT APPARATUS

CROSS-REFERENCE TO RELATED APPLICATIONS

The present application is a Continuation of PCT Patent Application No. PCT/US2014/016622, entitled "STARTUP METHOD AND MECHANISM FOR A BURNER HAVING A PERFORATED FLAME HOLDER", filed Feb. 14, 2014, co-pending herewith at the time of filing; which application claims priority benefit of U.S. Provisional Patent Application No. 61/765,022, entitled "PERFORATED FLAME HOLDER AND BURNER INCLUDING A PERFORATED FLAME HOLDER", filed Feb. 14, 2013; and U.S. Provisional Patent Application No. 61/931,407, entitled "LOW NOx FIRE TUBE BOILER", filed Jan. 24, 2014; each of which, to the extent not inconsistent with the disclosure herein, is incorporated by reference.

The present application is related to PCT Patent Application No. PCT/US2014/016628, entitled "PERFORATED FLAME HOLDER AND BURNER INCLUDING A PERFORATED FLAME HOLDER", filed Feb. 14, 2014, co-pending herewith at the time of filing; PCT Patent Application No. PCT/US2014/016632, entitled "FUEL COMBUSTION SYSTEM WITH A PERFORATED REACTION HOLDER", filed Feb. 14, 2014,co-pending herewith at the time of filing; and PCT Patent Application No. PCT/US2014/016626, entitled "SELECTABLE DILUTION LOW NOx BURNER", filed Feb. 14, 2014, co-pending herewith at the time of filing.

BACKGROUND

Combustion systems are widely employed throughout society. There is a continual effort to improve the efficiency and reduce harmful emissions of combustion systems.

SUMMARY

According to an embodiment, a combustion system is provided that includes a fuel nozzle configured to emit a diverging fuel flow, a perforated flame holder positioned in the path of the fuel flow and including a plurality of apertures extending therethrough. The combustion system also includes a preheater for preheating the perforated flame holder.

According to an embodiment, a combustion system includes a fuel nozzle configured to emit a diverging fuel flow, a perforated flame holder including a plurality of apertures extending therethrough positioned in the path of the fuel flow, and a preheating means for preheating the perforated flame holder.

According to an embodiment, the preheater and preheating means includes an electrically resistive element.

According to respective embodiments, the preheater and the preheating means include electrically inductive elements.

According to another embodiment, the preheater and preheating means includes a preheat nozzle configured to support a preheat flame in a position between the fuel nozzle and the flame holder.

According to an embodiment, preheating means includes first and second electrodes configured to hold a preheat flame in the position between the primary nozzle and the flame holder.

According to another embodiment, the preheating means includes a preheat flame holder configured to support a preheat flame in the diverging fuel flow in a position between the primary nozzle and the flame holder.

According to an embodiment, a combustion system is provided, which includes a nozzle configured to emit a diverging fuel flow, a flame holder positioned in the path of the fuel flow and that includes a plurality of apertures extending therethrough. The combustion system also includes preheating means, for preheating the primary flame holder.

According to an embodiment, a method of operation is provided, for operation of a flame holder. The method includes performing a burner startup procedure, including applying thermal energy to the flame holder, terminating the burner startup procedure after a temperature of a portion of the flame holder is above a startup temperature threshold, emitting a flow of fuel from a nozzle at an operational rate, and supporting a flame within a plurality of apertures extending through the flame holder. According to an embodiment, the applying thermal energy includes generating heat by applying an electrical potential across an electrically resistive element, and applying the heat to the flame holder.

According to an embodiment, the performing a burner startup procedure further includes holding a flame supported by fuel emitted from the primary nozzle at a location between the primary nozzle and a side of the flame holder facing the primary nozzle.

According to an embodiment, the performing a burner startup procedure includes holding the primary nozzle in a startup position and emitting a flow of fuel from the primary nozzle at a startup rate, the startup rate being sufficiently low as to enable a stable flame within the fuel flow. Additionally, the terminating the burner startup procedure includes moving the primary nozzle from the startup position to an operational position.

According to an embodiment, the terminating the burner startup procedure includes reducing a concentration of oxygen in a flow of air.

BRIEF DESCRIPTION OF THE DRAWINGS

FIG. 11A is a diagrammatic cross section of a combustion system during normal operation, according to an embodiment.

FIG. 11B is a diagrammatic cross section of a combustion system during startup, according to an embodiment.

DETAILED DESCRIPTION

Figure 1:
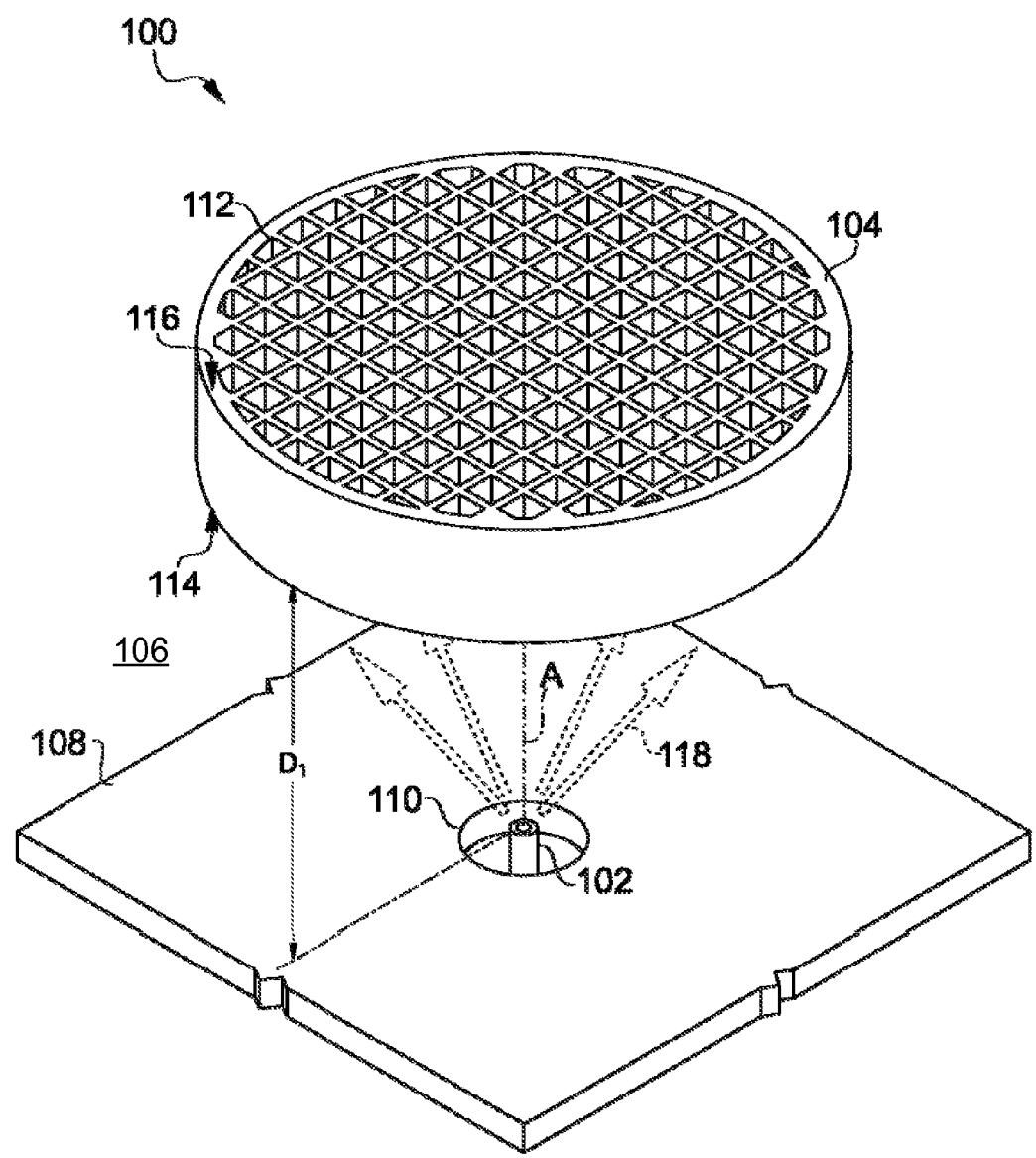
FIG. 1 is a diagrammatic perspective view of a burner system, according to an embodiment.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here.

FIG. 1 is a diagrammatic perspective view of a burner system 100, according to an embodiment. The burner system 100 includes a nozzle 102 and a flame holder 104 positioned within a combustion volume 106, part of which is defined by a wall 108. An aperture 110 extends through the wall 108. The nozzle 102 extends into the combustion volume 106 via the aperture 110. The aperture 110 is of a size selected to permit air to enter the combustion volume 106 in order to provide oxygen to support combustion within the combustion volume 106.

The term air refers to a fluid, typically gaseous, that includes oxygen in a form that can support combustion. While ambient air is the most common oxidizer fluid, many combustion systems employ a mixture that can include other additives, selected, generally, for the purpose of modifying the combustion in some way. For example, in many cases, flue gases are recirculated and mixed with ambient air to reduce the oxygen concentration in the oxidizer fluid, in order to reduce harmful emissions, according to very well known principles and processes. For the purpose of the present specification and claims, the term air is to be construed as referring to any such fluid or mixture of fluids, unless explicitly limited or defined otherwise.

The flame holder 104 of the combustion system 100 is preferably made from a refractory material, such as, e.g., ceramic, and includes a plurality of apertures 112, that extend from a first face 114 to a second face 116 of the flame holder.

The flame holder is positioned with the first face 114 toward the nozzle 102 and spaced away from the nozzle by a distance $D_1$. In the embodiment shown, the first and second faces 114, 116 of the flame holder 104 are planar, and lie substantially parallel to a plane that is perpendicular to a longitudinal axis A of the nozzle 102. According to alternative embodiments, the flame holder 104 can include faces that are non-planar, or that lie at different angles with respect to each other or to the longitudinal axis A of the nozzle 102.

In operation, a stream of fuel 118 is ejected from the nozzle 102 toward the first face 114 of the flame holder 104. The fuel stream 118 disperses from the nozzle 102 in a conical spray at an angle that is typically about 7.5 degrees from the longitudinal axis A, resulting in a solid conical angle of about 15 degrees. As the fuel stream 118 disperses, it entrains air, and eventually reaches a flammable proportion of fuel and air. By selection of the nozzle 102 and the pressure at which fuel is ejected, the velocity at which the fuel stream 118 is ejected from the nozzle 102 is preferably selected to be much higher than the flame propagation speed of the particular type of fuel employed, so that, on the one hand, the fuel stream is prevented from supporting a flame near the nozzle 102, and on the other hand, by the time the dispersing fuel stream 118 has slowed to near the flame propagation speed, the fuel stream has entrained enough air that the mixture is too lean for combustion at the temperature of the fuel stream 218.

However, the flame holder 104 is held at a much higher temperature because of ongoing combustion. The higher temperature of the flame holder 104 is sufficient to maintain combustion of the lean fuel mixture. A stable flame can thus be maintained by the flame holder 104. The flame is held primarily within the apertures 112, although the flame may extend a short distance beyond either or both faces 114, 116 of the flame holder 104. The fuel stream 118 is able to continually feed the combustion, and the flame holder 104 is able to support a leaner flame than could be maintained in a conventional burner system. The distance $D_1$ is selected, in part, according to a desired fuel-to-air ratio of the fuel stream 118 at the point at which the fuel stream contacts the flame holder 104.

The inventors have recognized that, although while in operation, the flame holder 104 is able to support combustion with a very lean fuel mixture, startup of the combustion system 100 is problematic. Because the fuel mixture at the distance $D_1$ is flammable only at elevated temperatures, and because the flame holder 104 may be at ambient temperature at startup, conventional ignition methods or devices are not generally effective for startup of the combustion system 100.

The inventors have developed various systems and methods for efficient startup of combustion systems that employ perforated flame holders. In the embodiments described hereafter, elements that are described with reference to previous embodiments, and that are referenced by a same reference number, are generally not described in detail.

Figure 2A:
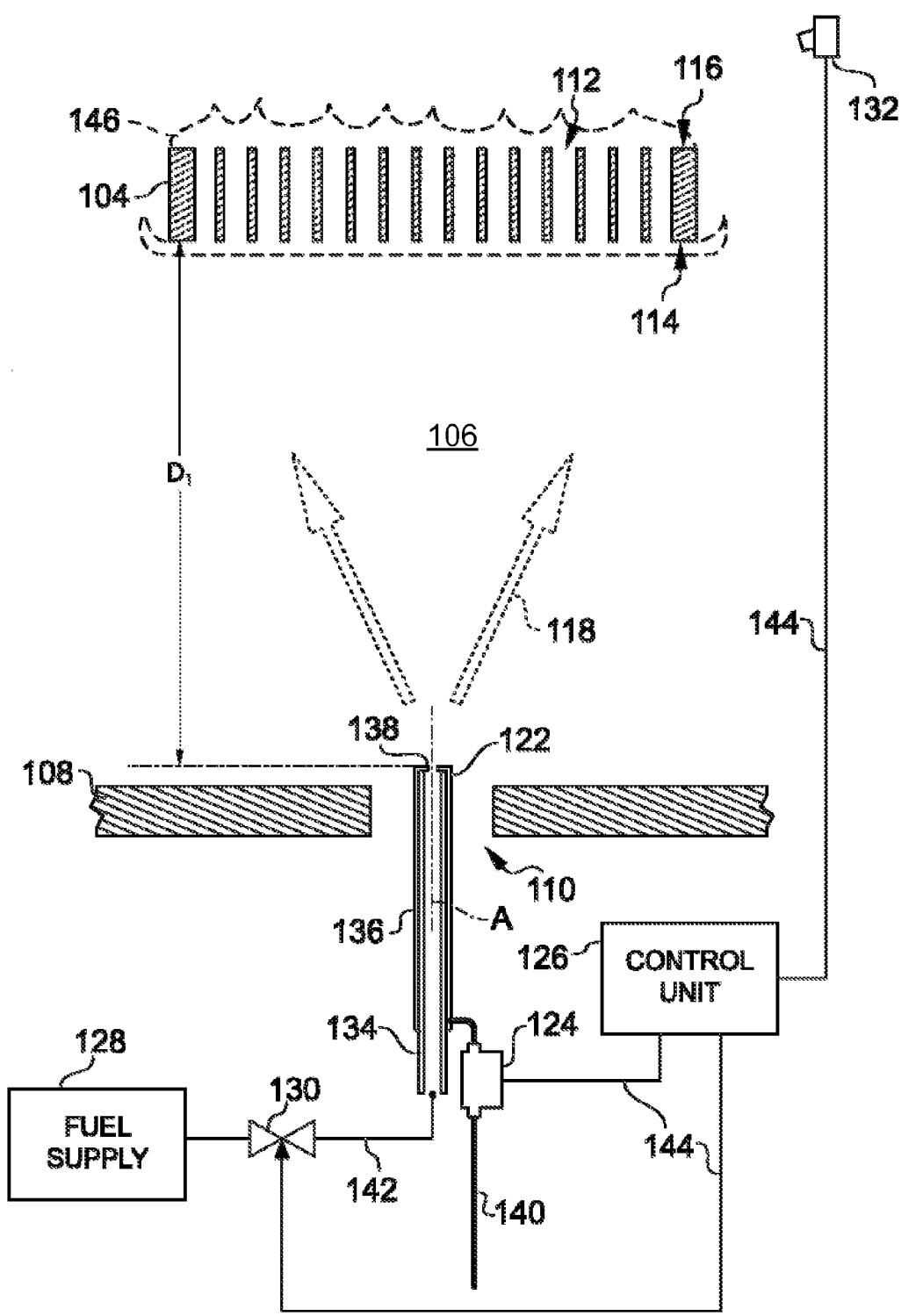
FIGS. 2A and 2B are diagrammatic side sectional views of a combustion system in respective modes of operation, according to an embodiment.
Figure 2B:
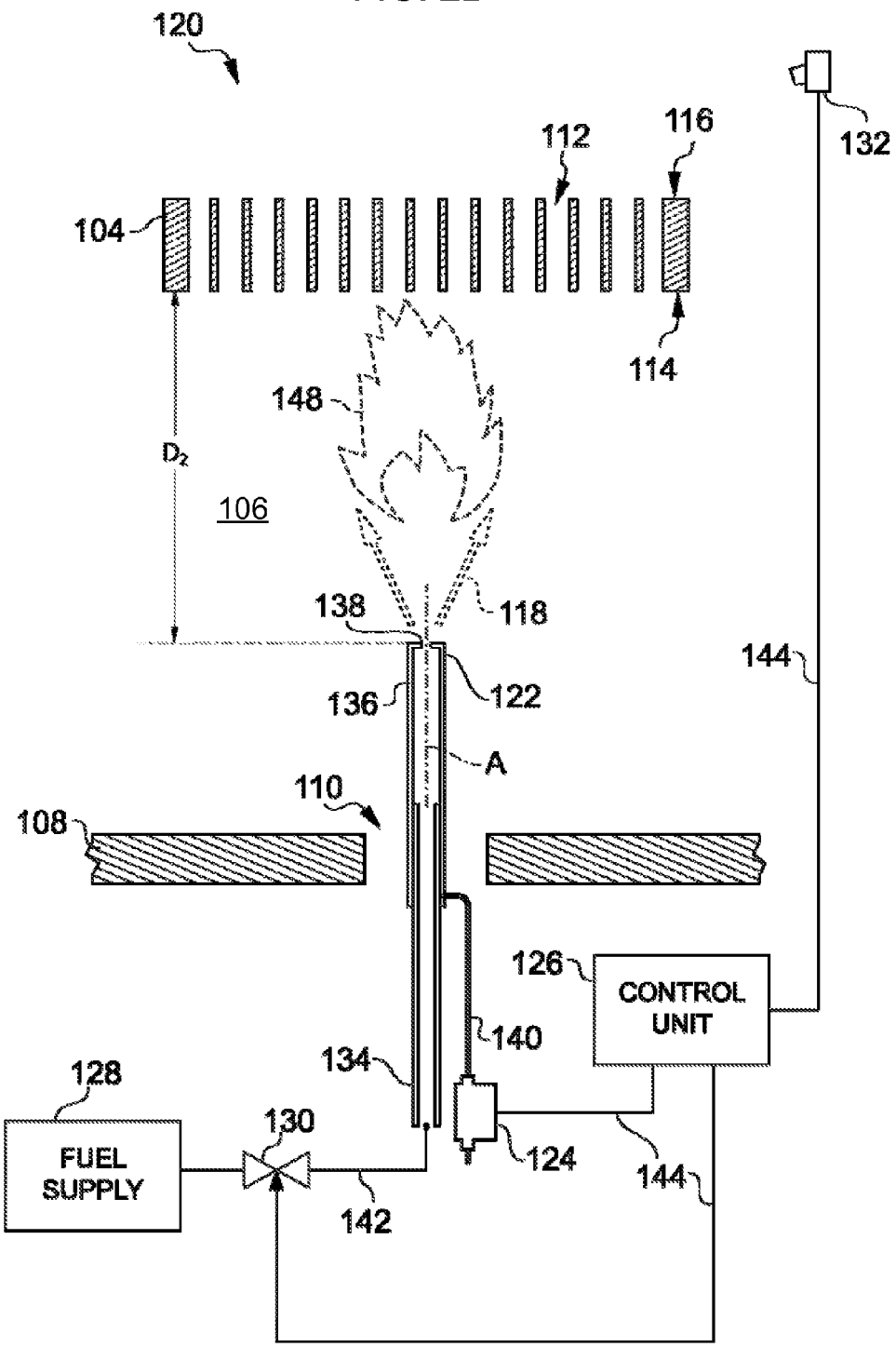

FIGS. 2A and 2B are diagrammatic side sectional views of a combustion system 120, according to an embodiment. The system 120 includes a nozzle 122, a nozzle position controller 124, a system control unit 126, a fuel supply 128, a fuel control valve 130, and a temperature sensor 132.

The nozzle 122 is configured to be translatable along its longitudinal axis A. As shown, the nozzle 122 includes inner and outer telescoping elements 134, 136. The inner telescoping element 134 is fixed, while the outer telescoping element 136, which includes a nozzle orifice 138, is movable between a retracted position, as shown in FIG. 2A, and an extended position, which is shown in FIG. 2B and described in more detail below. Movement of the outer telescoping element 136 changes the distance between the nozzle 122 and the flame holder 104. Movement of the outer telescoping element 136 is controlled by operation of the nozzle position controller 124, which, in the example shown, acts as a linear actuator driving a position control rod 140 that is coupled to the outer telescoping element 136.

The fuel supply 128 is coupled to the nozzle via a fluid line 142. The fuel control valve 130 is coupled in the fluid line 142 and configured to control the flow of fuel from the fuel supply 128 to the nozzle 122.

The temperature sensor 132 is positioned and configured to detect a temperature of the flame holder 104, and to transmit a signal representative of the detected temperature to the system control unit 126 via connector 144. As shown in FIG. 2A, the temperature sensor 132 is an infrared transducer, configured to detect infrared emissions of the flame holder 104 and to interpret the detected emissions to produce a signal that is representative of the temperature. Other types of temperature sensors are well known that can be used to detect the temperature of the flame holder 104. These include, for example, sensors based on thermocouples, thermistors, pyrometers, radiometers, positive or negative thermal coefficient resistors, etc.

The system control unit 126 is operatively coupled to the temperature sensor 132, the fuel control valve 130, and the nozzle position controller 124 via connectors 144, and is configured to receive data from the temperature sensor 132 and to control operation of the fuel control valve 130 and the nozzle position controller 124.

The combustion system 120 is shown in FIG. 2A in an operational mode, operating substantially as described with reference to the system 100 of FIG. 1. In operational mode, the nozzle 122 is separated from the first face 114 of the flame holder 104 by the distance $D_1$, a fuel stream 118 is ejected from the nozzle 122 at an operational rate, and the flame holder 104 supports a stable primary flame 146.

FIG. 2B shows the combustion system 120 in startup mode, in which the outer telescoping element 136 is in its extended, i.e., startup position, in which the distance $D_2$ between the nozzle 122 and the flame holder 104 is significantly reduced, as compared to the distance $D_1$. Additionally, the system control unit 126 controls the fuel control valve 130 to reduce the volume and velocity of the fuel stream 118 ejected by the nozzle 122. Because the velocity of the fuel stream 118 is reduced, a stable startup flame 148 can be supported by the nozzle 122, alone, in a position between the nozzle and the flame holder 104. By moving the nozzle 122 to the extended position, the startup flame 148 is positioned close to the flame holder 104, and is thus able to quickly heat a portion of the flame holder 104 to a temperature that exceeds a threshold defining a minimum startup temperature (i.e., the startup temperature threshold) of the flame holder. When the signal from the temperature sensor 132 indicates that the temperature of the flame holder 104 is above the threshold, the system control unit 126 controls the nozzle position controller 124 to move the nozzle 122 to the retracted, operational position, and controls the fuel control valve 130 to open further, increasing the fuel flow 118 to an operational level. As the velocity of the fuel stream 118 increases, the startup flame 148 is blown out. As the uncombusted fuel mixture reaches the flame holder 104, the mixture auto-ignites, at least within the portion of the flame holder that has been heated beyond the startup threshold. Very quickly thereafter, the entire flame holder 104 is heated to its operating temperature, and continues in normal operation thereafter.

According to another embodiment, the system control unit 126 includes a timer by which transition from startup mode to operational mode is controlled. i.e., when startup is initiated, the system control unit 126 starts the timer, and when a selected time period has passed, the nozzle 122 is retracted and the fuel flow is increased, as described above. The time period is selected according to a predetermined period necessary to ensure that the flame holder 104 has reached the startup temperature threshold.

The movable nozzle 122 can also be employed in combustion systems that may be required to operate on a variety of fuels. As is well known in the art, the fuel-to-air ratio at which the mixture is combustible varies according to the type of fuel, as does flame propagation speed within a flow of fuel. Thus, an optimal operating distance $D_1$ will vary according to the type of fuel. The combustion system 120 of FIGS. 2A and 2B can accommodate changes in fuel type by adjustment of the position of the nozzle 122 relative to the flame holder 104. The adjustment can be made by direct manual control of the nozzle 122, or the system control unit 126 can be programmed to make the adjustment automatically. For example, additional sensors can be positioned to detect emission levels of flames propagating within the fuel stream 118, incomplete combustion, etc., in response to which the system control unit 126 can be programmed to modify the position of the nozzle 122 and/or the fuel flow (by adjustment of the fuel control valve 130, to bring the operation of the system closer to an optimum or desired level.

According to an alternate embodiment, the flame holder 104 is configured to be translatable along the longitudinal axis A of the nozzle. This enables adjustments in the distance D between the nozzle 122 and flame holder 104 without changing the position of the nozzle. According to an embodiment, the combustion system 120 includes a flame holder that is translatable along the axis A and also a nozzle that is movable or translatable along the axis A. With such a configuration, a user can, for example, move the flame holder to a position that is more or less permanent, in order to establish a desired distance D on the basis of combustion characteristics of a particular fuel. Meanwhile, the nozzle can be configured to be moved for startup purposes, as described above, or for some other reason.

Figure 3:
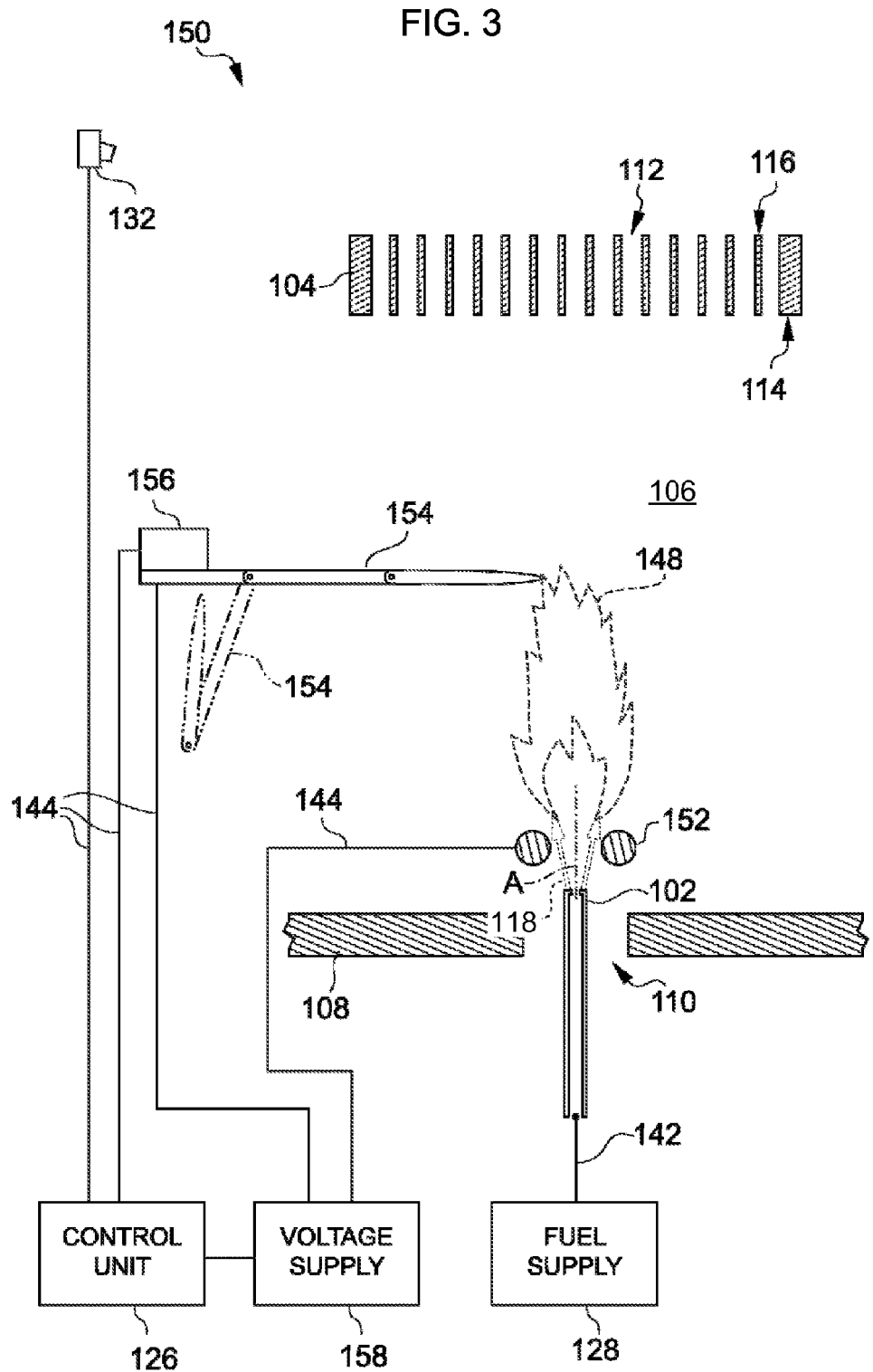
FIG. 3 is a diagrammatical side view of a combustion system, according to an embodiment, portions of which are shown in sectional view.

FIG. 3 is a diagrammatical side view of a combustion system 150, according to an embodiment, portions of which are shown in section. The combustion system includes a first electrode 152 and preferably a second electrode 154, both operatively coupled to a voltage supply 158. An electrode position controller 156 and the voltage supply 158 are also coupled to a system control unit 126.

The first electrode 152 is in the shape of a torus, positioned just downstream of the nozzle 102 and centered on the longitudinal axis A of the nozzle so that the fuel stream 118 passes through the first electrode 152. The second electrode 154 is positioned between the first face 114 of the flame holder 104 and the nozzle 102. The second electrode 154 is movable from an extended position, as shown in solid lines in FIG. 3, to a retracted position, shown in phantom lines. The electrode position controller 156 is configured to extend and retract the second electrode 154. In the extended position, the second electrode 154 extends to a position close to or intersecting the longitudinal axis A. In the retracted position, the second electrode 154 is spaced away from contact with the fuel stream 118 or a flame supported thereby. According to an embodiment, a temperature sensor 132 is provided, as previously described.

In operation, when the combustion system 150 is in startup mode, i.e., when startup is initiated, the system control unit 126 controls the electrode position control 156 to move the second electrode 154 to the extended position. The system control unit 126 controls the voltage supply 158 to transmit a first voltage signal to the first electrode 152. As the fuel stream 118 passes through the first electrode 152, an electrical charge having a first polarity is imparted to the fuel stream. Meanwhile, the system control unit 126 transmits a second voltage signal from the voltage supply 158 to the second electrode 154. The second voltage signal has a polarity that is opposite that of the charge imparted to the fuel stream, and therefore attracts the oppositely-charged fuel stream. Ignition is initiated within the fuel stream 118, whereupon a startup flame 148 is held between the first and second electrodes 152, 154, in spite of the high velocity of the fuel stream. This method of holding a flame within a fuel flow is sometimes referred to as electrodynamic combustion control.

According to an embodiment, the system control unit 126 controls the voltage supply 158 to apply a voltage signal to the second electrode 154 while connecting the first electrode 152 to ground. According to an embodiment, the voltage signal applied to the first and/or second electrode is an AC signal.

With the startup flame 148 held below the first surface 114 of the flame holder 104, a portion of the flame holder 104 is quickly heated to the startup temperature threshold. When the startup temperature threshold is surpassed, the system control unit 126 controls the voltage supply 158 to remove the voltage signals from the first and second electrodes 152, 154, and controls the electrode position controller 156 to move the second electrode 154 to the retracted position. When the voltage signals are removed from the electrodes 152, 154, the startup flame 148 is no longer held, and blows out. As previously described, when the uncombusted fuel and air mixture reaches the flame holder 104, the primary flame auto-ignites in the preheated portions of the flame holder, and normal operation quickly follows.

Although embodiments are described as including a system control unit 126 that is configured to control transition between a startup mode and an operational mode, alternative embodiments are operated manually. For example, according to an embodiment, the combustion system 150 is configured such that an operator manually switches the electrode position controller 156 to move the second electrode 154. According to another embodiment, the operator manually extends and retracts the second electrode 154. Additionally, according to an embodiment, an operator manually switches a voltage signal to the first and second electrodes 152, 154, and switches the signals off when the flame holder 104 exceeds the startup threshold.

According to an embodiment, a portion of the nozzle 102 is electrically conductive, and acts as the first electrode 152, with the connector 144 being coupled to the conductive portion of the nozzle. According to an embodiment, the second nozzle 154 is retracted by a telescoping mechanism similar to that described with reference to the nozzle of FIGS. 2A and 2B. According to another embodiment, the second electrode 154 is formed as a conductive layer positioned on the first face 114 of the flame holder 104.

Figure 4:
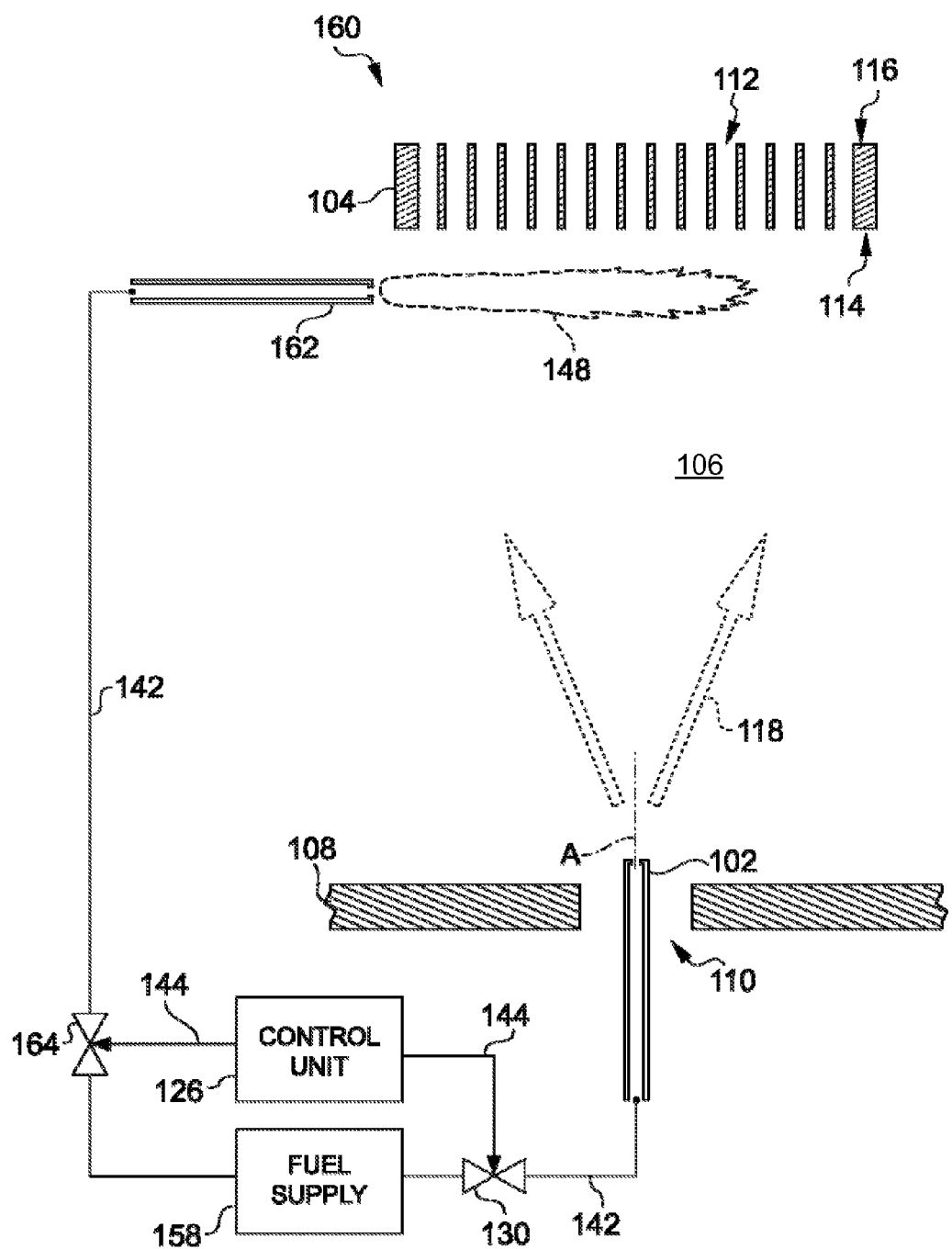
FIG. 4 is a diagrammatic side sectional view of a combustion system, according to an embodiment.

FIG. 4 is a diagrammatic side sectional view of a combustion system 160, according to an embodiment. In the combustion system 160, the nozzle 102 is a primary nozzle, and the system further includes a secondary nozzle 162 positioned between the primary nozzle and the flame holder 104. The fuel supply 158 is coupled to the primary nozzle 102 and the secondary nozzle 162 via fuel lines 142. A primary fuel valve 130 controls a flow of fuel from the fuel supply 158 to the primary nozzle 102, and a secondary fuel valve 164 controls a flow of fuel from the fuel supply to the secondary nozzle 162. The system control unit 126 is operatively coupled to the primary and secondary fuel valves 130, 164 via connectors 144.

In operation, when startup is initiated, the system control unit 126 controls the secondary fuel valve 164 to open—the primary fuel valve 130 is closed—and ignites a stream of fuel that exits the secondary nozzle 162, producing a startup flame 148 that is directly adjacent to the first face 114 of the flame holder 104. The startup flame 148 heats a portion of the flame holder 104 to a temperature exceeding the startup threshold. When the system control unit 126 determines that a portion of the flame holder 104 exceeds the startup temperature threshold—via, for example, a signal from a temperature sensor, as described previously—the system control unit controls the secondary fuel valve 164 to close, while controlling the primary fuel control valve 130 to open, causing a fuel stream 118 to be ejected by the primary nozzle 102. When the fuel and air mixture of the fuel stream 118 reaches the flame holder 104, a primary flame is ignited and normal operation follows, substantially as described with reference to previously embodiments.

Figure 5:
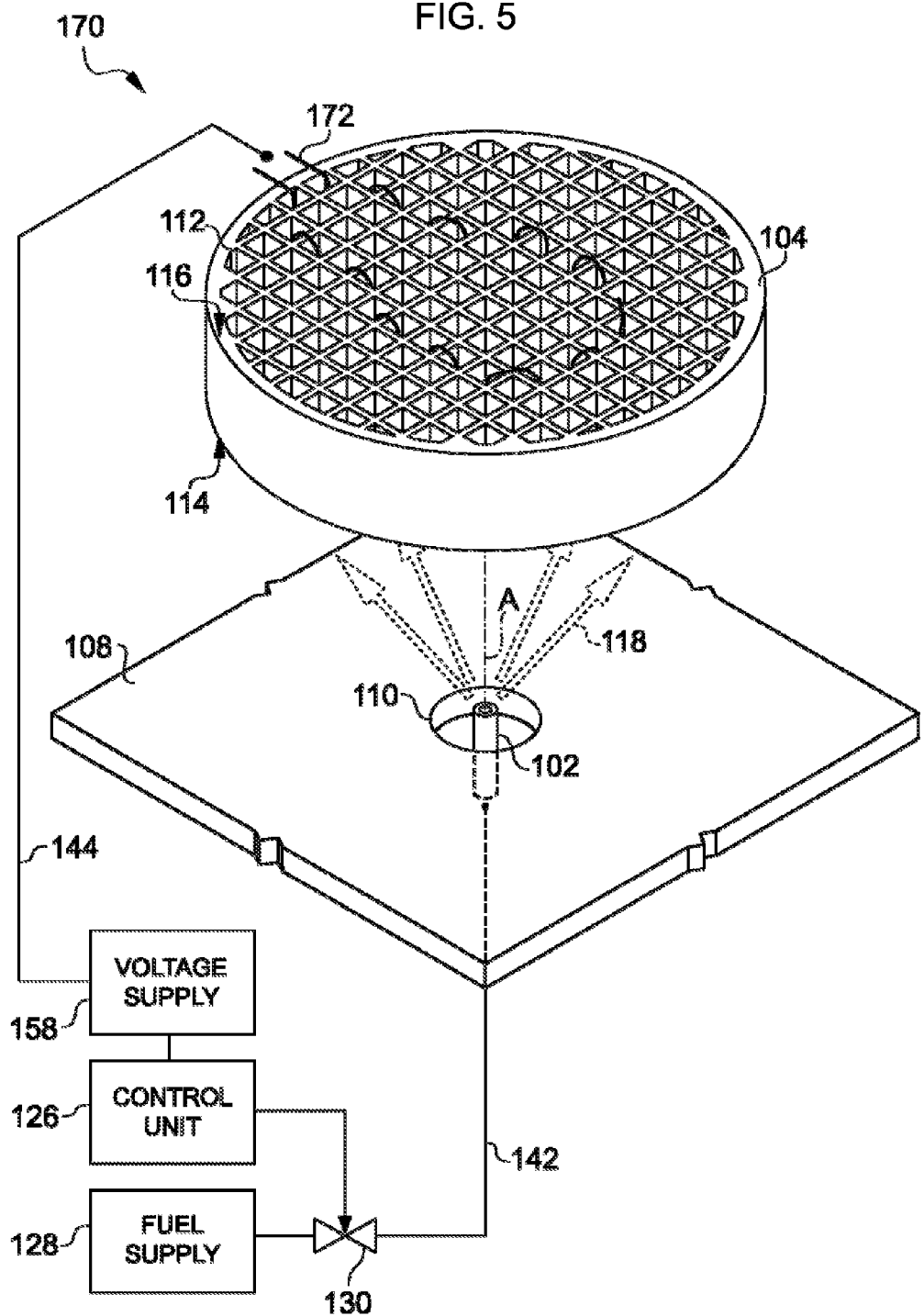
FIG. 5 is a diagrammatic perspective view of a combustion system, according to an embodiment.

FIG. 5 is a diagrammatic perspective view of a combustion system 170, according to an embodiment. The burner system 170 is similar in many respects to the system 100 described with reference to FIG. 1, and includes many of the same elements. However, the system 170 also includes an electrically resistive heating element 172. In the embodiment shown, the heating element 172 is in the form of a wire that is interleaved in and out through some of the plurality of apertures 112. The heating element 172 is operatively coupled to a voltage supply 158 via a connector 144. During a startup procedure, the system control unit 126 controls the voltage supply 158 to apply a voltage potential across the ends of the heating element 172. The resistance value of the heating element 172 and the magnitude of the voltage potential are selected to generate sufficient heat to raise the temperature of the portion of the flame holder 104 in the vicinity of the heating element to beyond the startup threshold within a few seconds, after which the system control unit 126 controls valve 130 to open, while controlling the voltage supply 158 to remove the voltage potential from the heating element 172. When the fuel stream 118 contacts the heated portion of the flame holder 104, auto-ignition occurs, and a stable flame is established in the flame holder 104. Thereafter, operation of the burner system 170 is substantially as described previously with reference to other embodiments.

FIGS. 6-9 are diagrammatic cross sections of flame holders according to respective embodiments. Each of the flame holders of FIGS. 6-9 includes an electrically resistive heating element that is integral with the respective flame holder. Each of the flame holders is configured for use in a combustion system similar to the system 170 described with reference to FIG. 5.

Figure 6:
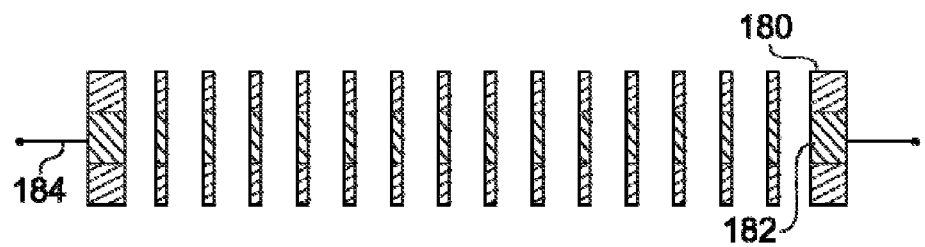
FIGS. 6-9 are diagrammatic cross sections of flame holders, according to respective embodiments.

FIG. 6 shows a flame holder 180 that includes a heating element 182 that is encapsulated by the material of the flame holder. Terminals 184 are electrically coupled to the heating element 182 and extend from the flame holder 180 for connection to a voltage source. According to an embodiment, the heating element 182 extends across the entire flame holder 180, so that, in operation, the entire flame holder is heated when the heating element is energized. Thus, when the flame holder 180 is heated to beyond the startup threshold and a fuel and air mixture is turned on, the entire flame holder supports combustion instantly. According to another embodiment, the heating element 182 extends across only a portion of the flame holder 180. In this embodiment, less power is required to bring the portion of the flame holder 180 to the startup temperature threshold, and the heating element 182 takes less time to heat the smaller portion of the flame holder 180.

Figure 7:
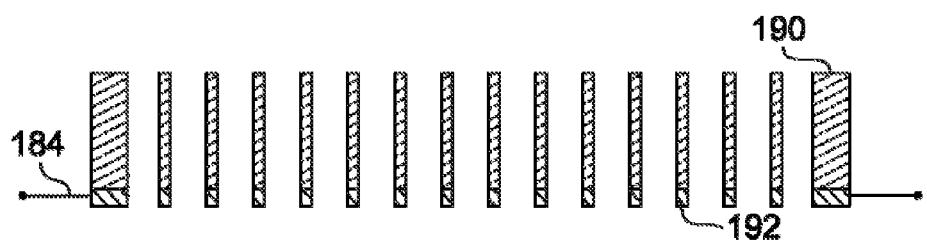

FIG. 7 shows a flame holder 190 that includes a heating element 192 located on one of the faces of the flame holder. This embodiment may be simpler to manufacture than the flame holder of FIG. 6, inasmuch as the manufacturing options are wider. For example, the heating element 192 can be attached to the flame holder 190 at the end of the manufacturing process, or it can be attached at an intermediate step, then shaped or machined along with the main part of the flame holder.

Figure 8:
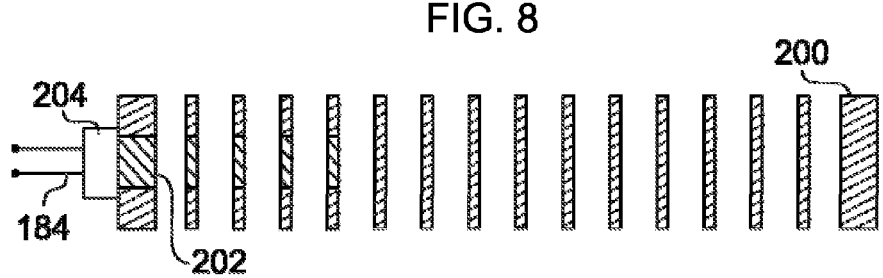

FIG. 8 shows a flame holder 200 that includes a section of thermally conductive material 202 that is encapsulated in the material of the main part of the flame holder, and a heating element 204 coupled to the flame holder in direct thermal contact with the section of thermally conductive material. In operation, when the heating element 204 is energized, heat is transmitted by conduction to the section of thermally conductive material 202, which carries the heat into a portion of the flame holder 200. One advantage of this embodiment is that the heating element can be configured to be removable, which enables, in the event of a malfunction, replacement of the heating element 204 alone, instead of the entire flame holder 200.

Figure 9:
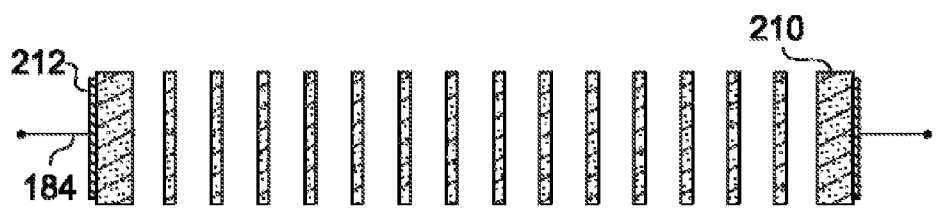

FIG. 9 shows a flame holder 210 that is made from a material that includes particles of an electrically conductive substance. For example, the flame holder 210 can be made of a ceramic material impregnated with metallic particles. By selecting the density of conductive particles, the resistance of the material can be selected. The terminals 184 are coupled to conductive plates 212 in direct contact with the material of the flame holder 210. The plates 212 provide a broad electrical contact with the material in order to avoid highly resistive conduction regions, which would create hot spots at the points of contact.

Figure 10:
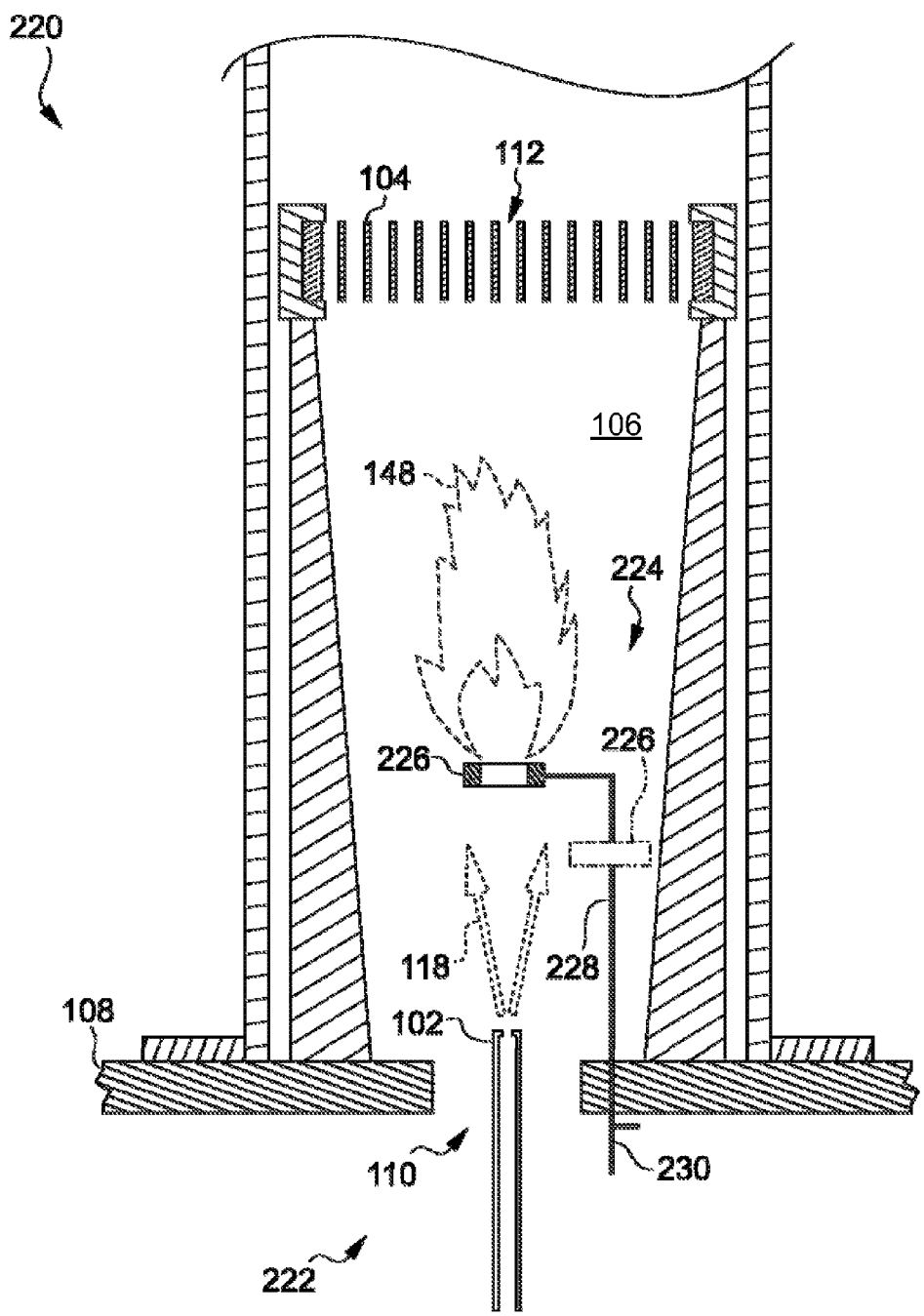
FIG. 10 is a diagrammatic cross section of a portion of a boiler that includes a combustion system, according to an embodiment.

FIG. 10 is a diagrammatic cross section of a portion of a boiler 220, according to an embodiment. The boiler 220 includes a burner mechanism 222 and a startup apparatus 224. The burner mechanism includes a nozzle 102 and a primary flame holder 104. The startup apparatus 224 includes a startup flame holder 226 and a flame holder position controller 228. The startup flame holder 226 includes a bluff body configured to cause vortices to circulate heat to maintain a start-up flame 148, in order to pre-heat the primary flame holder 104 during a startup procedure. The flame holder position controller 228 is configured to move the startup flame holder 226 between a startup position, as shown in FIG. 10, and a retracted position, as shown in phantom lines. The flame holder position controller 228 includes a rod (also indicated by 228) that extends through a wall 108 for access from outside the combustion volume 106. In the embodiment shown, the flame holder position controller 228 is configured to be manipulated by an operator before and after a startup procedure. According to an alternate embodiment, the flame holder position controller 228 includes an actuator that automatically moves the startup flame holder 226 between the startup position and the retracted position.

To move the startup flame holder 226 from the startup position to the retracted position, the operator grasps a handle 230 at the end of the rod 228, rotates the rod, which moves the startup flame holder 226 substantially out of the path of the fuel stream 118, then pulls the rod outward, which translates the startup flame holder into a space that is fully out of the path of the fuel stream 118.

FIG. 11A is a diagrammatic cross section of a combustion system 240 during normal operation, according to an embodiment. The combustion system 240 includes a flame holder 104, a nozzle 102, an air conduit 242 and an air mixture control valve 244. The air conduit 242 is coupled to the wall 108 over the aperture 110. Thus, air 246 entering the combustion volume 106 passes through the air conduit 242.

The air mixture control valve 244 includes a valve gate 247 and acts as a proportion control valve, configured to control a proportion of components of the air 246 that is introduced into the combustion volume 106. In the embodiment shown, the air mixture control valve 244 is configured to control the respective proportions of two components that are introduced via first and second valve input ports 248, 250. Pivoting of the valve gate 247 in, for example, a clockwise direction increases the proportion of a fluid entering via the first valve input port 248 while simultaneously reducing the proportion of fluid entering the valve via the second valve input port 250. Conversely, pivoting of the valve gate 247 in the counter-clockwise direction reduces the proportion from the first valve input port 248 and increases the proportion from the second valve input port 250.

In the embodiment of FIG. 11A, recirculated flue gas 252 is introduced to the control valve 244 via the first input port 248, while ambient air 254 is introduced via the second input port 250. The valve gate 247 controls the proportions of the recirculated flue gas 252 and ambient air 254 that are admitted to air conduit 242 via the valve 244.

As explained in more detail above with reference to FIG. 1, in combustion systems of the general type described in the present disclosure, nozzle shape and fuel pressure are preferably selected to prevent the fuel stream 118 from supporting a flame separate from the flame holder 104. Specifically, the fuel stream velocity at the nozzle 102 is selected to be sufficiently high that by the time the stream 118 has slowed to about the flame propagation speed, for the particular type of fuel, the fuel in the stream will have been diluted by entrained air to the point that it is no longer flammable at the temperature of the fuel stream 118. This point is related not only to the amount of fuel and oxygen in the mix, but also to the ratio of fuel to other components in the stream. Dilution of the fuel in the stream 118 separates the fuel molecules so that combustion of one molecule does not provide sufficient heat to nearby fuel molecules to maintain combustion. Thus, in some cases, the fuel-air mix in the fuel stream 118 can be made flammable more quickly if the proportion of oxygen in the air is higher.

According to an embodiment, the combustion system 240 is configured for normal operation with air that has a significantly lower oxygen content than is found in ambient air. Accordingly, as shown in FIG. 11A, valve gate 247 of the air mixture valve 244 is positioned to produce an air mixture that has a high proportion of recirculated flue gas 252, which has a relatively low oxygen content, thereby reducing the overall oxygen concentration in the air.

While the introduction of recirculated flue gas can have beneficial effects with respect to the production of NOx, a system configured to operate with recirculated flue gas can have advantages related to startup, as well.

FIG. 11B shows the combustion system 240 in a startup mode, according to an embodiment. It can be seen that the valve gate 247 is in a position in which the first input port 248 is completely closed, meaning that there is no recirculated flue gas 252 being introduced. Consequently, ambient air 254 is the only component of the air 246 that is introduced into the combustion volume 106 during startup. The result is that the oxygen concentration in the entrained air is higher than would be appropriate for normal operation, and that the fuel stream 118 is still flammable at the point at which the stream 118 slows to the flame propagation speed. Under these circumstances, the fuel stream 118 can support a startup flame 148 at a position between the nozzle 102 and the flame holder 104. The system 240 operates in startup mode long enough for the flame holder 104 to be heated by the startup flame 148. Once at least a portion of the flame holder 104 exceeds the startup threshold, the control gate 247 is controlled to move toward the position shown in FIG. 11A, introducing recirculated flue gas 252, and reducing the oxygen concentration of the air 246. The startup flame 148 goes out, and combustion initiates in the apertures 112 of the flame holder 104.

In the embodiment described with reference to FIGS. 11A and 11B, a startup flame 148 is enabled by retaining flammability of the fuel/air mixture beyond a point where the fuel stream 118 has slowed to the flame propagation speed. According to another embodiment, a startup flame 148 is enabled by temporarily increasing the flame propagation speed. For example, flame propagation speed in hydrogen is several times that of a flame in methane. Accordingly, a system can be designed and configured in which the velocity of the fuel stream is selected to prevent a flame from being supported away from the flame holder 104 while methane is ejected from the nozzle, but to support a startup flame while hydrogen is provided as the fuel. While hydrogen is used, the flame propagation speed is high enough for a flame to be supported between the nozzle and the flame holder, but once the flame holder 104 is above the startup temperature threshold, the fuel is switched to methane or the like, causing the flame to lift to the flame holder 104.

Various methods and devices can be used to enable operation of the combustion system 240. For example, an oxygen sensor can be positioned in the air conduit 242, with an output coupled to the controller 126, to enable the controller to monitor the air oxygen level of the air 246. A temperature sensor and/or a timer can be provided, as previously described, to enable the controller 126 to determine when to transition from the startup mode to the operation mode, etc.

Figure 12:
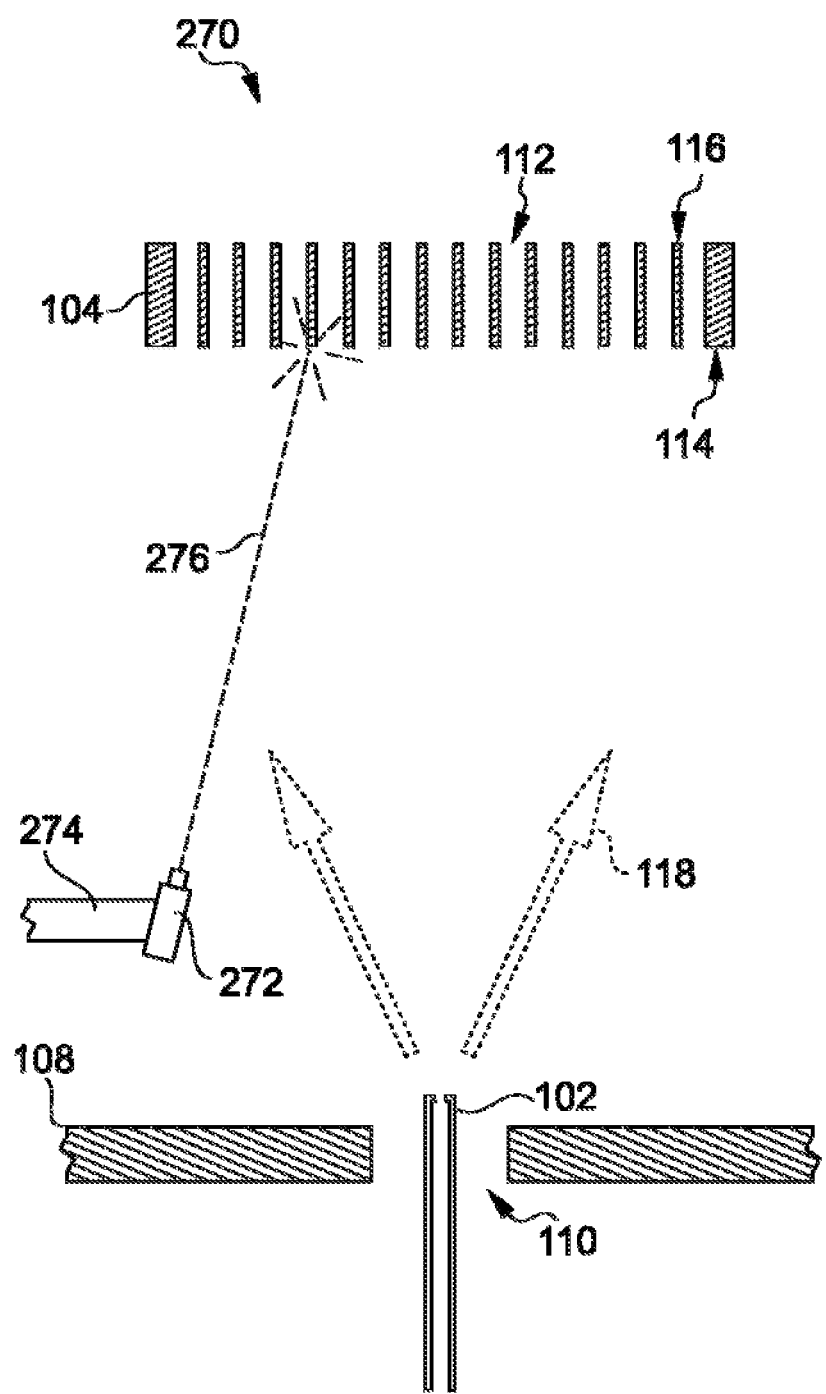
FIG. 12 is a diagrammatical side sectional view of a combustion system, according to an embodiment.

FIG. 12 is a diagrammatical side view of a combustion system 270, according to an embodiment. The combustion system 270 includes a laser emitter 272 supported by a bracket 274, positioned and configured to emit a laser beam 276 that impinges in a portion of the first face 114 of a flame holder 104. Photonic energy delivered by the laser beam 276 is converted into thermal energy within the flame holder 104, thereby heating a portion of the flame holder 104. When the portion of the flame holder 104 exceeds the startup temperature threshold, fuel is sent to a nozzle 102 and ejected into a fuel stream 118 toward the flame holder 104, and the laser 272 is shut down. In the embodiment shown, the laser 272 is held in a fixed position that is sufficiently removed from the flame holder 104 and fuel stream 118 as to cause no interference with normal operation of the system, and to be substantially unaffected by the environment. According to another embodiment, the bracket 274 is configured to hold the laser emitter 272 much closer to the first face 114 of the flame holder 104 for more efficient energy transfer. Accordingly, the bracket 274 is also configured to retract the laser 272 from the vicinity of the fuel stream 118 when the system 270 is not in startup mode.

FIG. 12 shows a laser emitter 272 configured to transmit energy in a non-thermal form, which is converted to thermal energy upon impinging on the flame holder 104. According to various embodiments, other devices are configured to transmit non-thermal energy onto the flame holder 104 to be converted to thermal energy. For example, according to an embodiment, a microwave transmitter is positioned and configured to direct a microwave emission onto a surface of the flame holder 104. In that embodiment, the flame holder 104 includes a patch of material that is configured to absorb the microwave emission and to convert a portion of the transmitted energy to heat.

Figure 13:
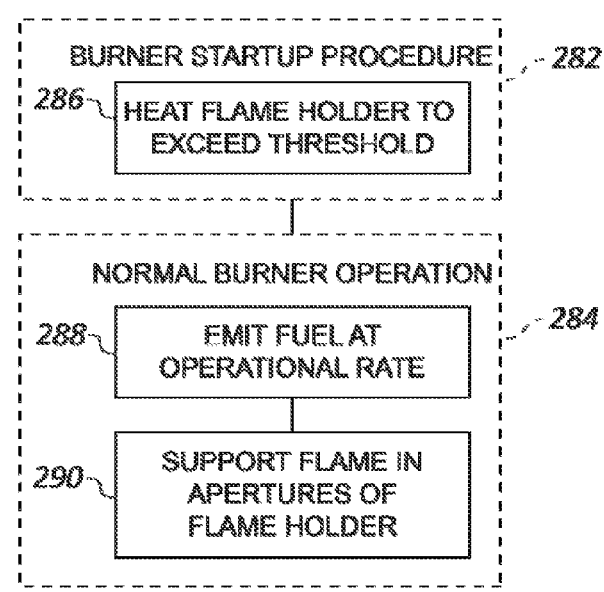
FIGS. 13-18 are flow charts illustrating methods of operation of a burner system, according to respective embodiments.

FIGS. 13-18 are flow charts illustrating methods of operation of a burner system, according to respective embodiments. FIG. 13 shows a method 280 that includes two basic steps. In step 282, a burner startup procedure is performed, after which the combustion system moves to normal burner operation in step 284. The burner startup procedure of step 282 includes step 286, heating a flame holder to exceed a startup temperature threshold. The normal burner operation of step 284 includes the steps of emitting fuel at an operational rate, at step 288, and supporting a flame in apertures of a flame holder, at step 290.

Figure 14:
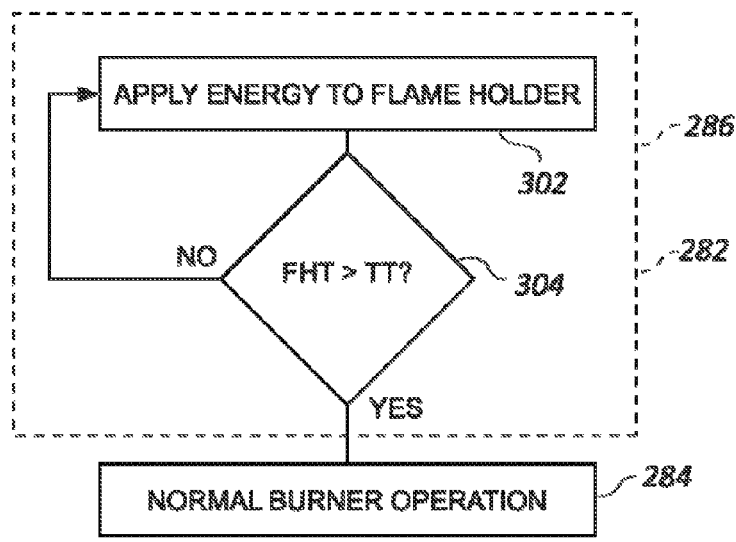

FIG. 14 illustrates a method 300 in which the heating a flame holder step 286 of FIG. 13 includes a step 302, applying energy to the flame holder, after which, in step 304, it is determined whether the flame holder temperature is greater than the temperature threshold. If the flame holder temperature is not greater than the temperature threshold, the process returns to the previous step, 302. If the flame holder temperature is greater than the temperature threshold, the process proceeds to normal burner operation, in step 284.

The step of applying energy to the flame holder, step 302, can be accomplished via any of a number of different structures and devices, some examples of which are disclosed above. For example, the energy can be applied by means of an electrically resistive element, as described with reference to FIGS. 5-9, by transmitting energy in a non-thermal form, as described with reference to FIG. 12, or by supporting a startup flame in a position to heat the flame holder, as described with reference to FIGS. 2B-4, 10, and 11B.

Figure 15:
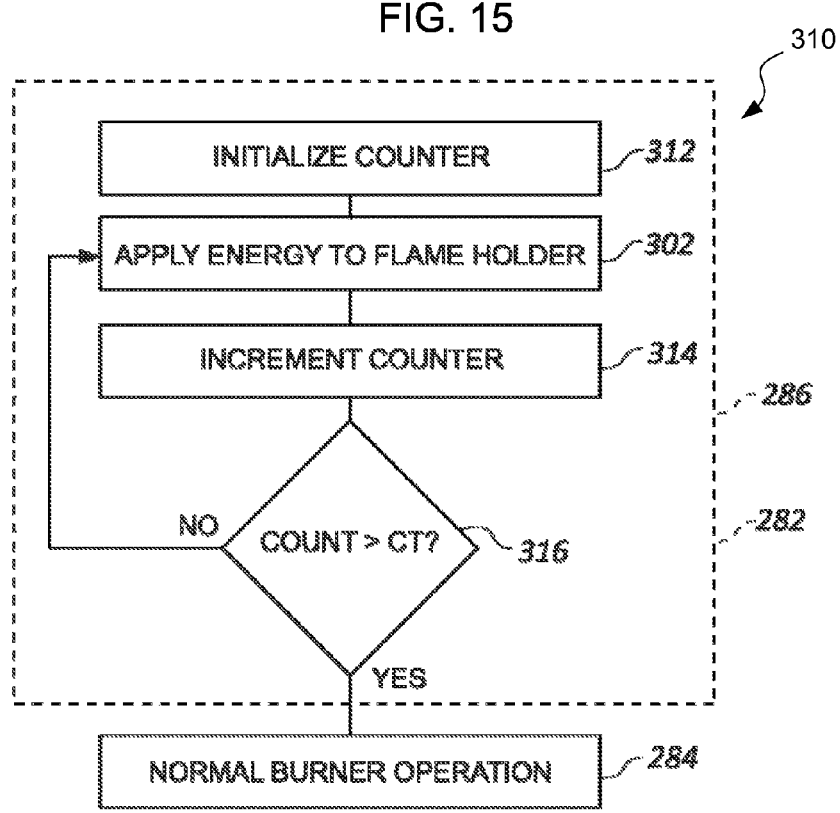

FIG. 15 illustrates a method 310 in which the heating a flame holder step 286 of FIG. 13 includes a step 312, initializing a counter. In a cycling process like that of the embodiment of FIG. 15, a counter acts as a timer element. The counter is initialized by setting it to zero, and a threshold number representing a selected time period is established. Following initialization of the counter in step 312, the apply energy step 302 is performed, after which a number held by the counter is increased by one. In step 316, the count, i.e., the number in the counter, is compared to the count threshold (CT), i.e., the threshold number representing the selected time period. If the count does not exceed the count threshold, the process cycles back to the apply energy step (302) and repeats. If the count does exceed the count threshold, the process proceeds to normal burner operation, in step 284.

Figure 16:
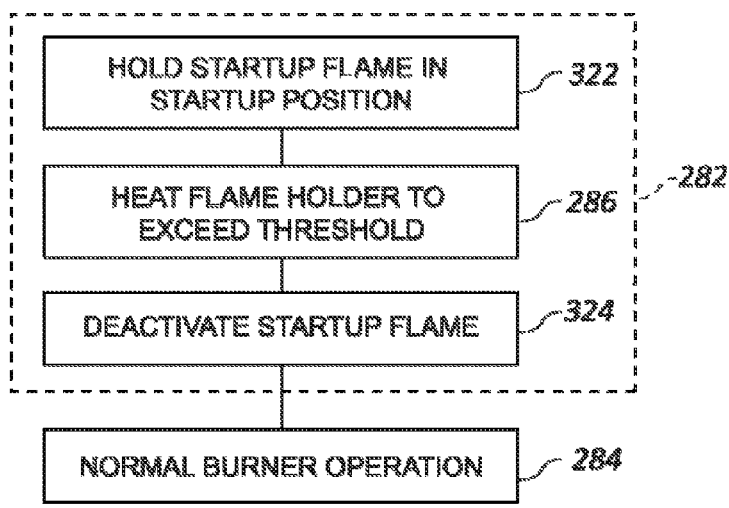

FIG. 16 illustrates a method 320 in which the burner startup procedure step 282 of FIG. 13 includes step 322, holding a startup flame in a startup position, followed by the heat flame holder step 286, then by step 324, in which the startup flame is deactivated. Examples of structures configured to hold startup flames are disclosed above with reference to FIG. 2B, in which fuel is ejected from a primary at a lower velocity, FIG. 3, in which an electrodynamic combustion control system is employed to hold a startup flame between the primary nozzle and the flame holder, FIG. 4, in which a startup nozzle is configured to support a startup flame, FIG. 10, in which a startup flame holder is positioned within a fuel stream to mechanically disrupt the fuel stream and enable heat recirculation within a turbulence zone, and FIG. 11B, in which a fuel stream is made to entrain air with a higher oxygen content in order to create a region of the primary fuel stream that will support a startup flame.

In each of the above-referenced examples, deactivation procedures are also disclosed.

Figure 17:
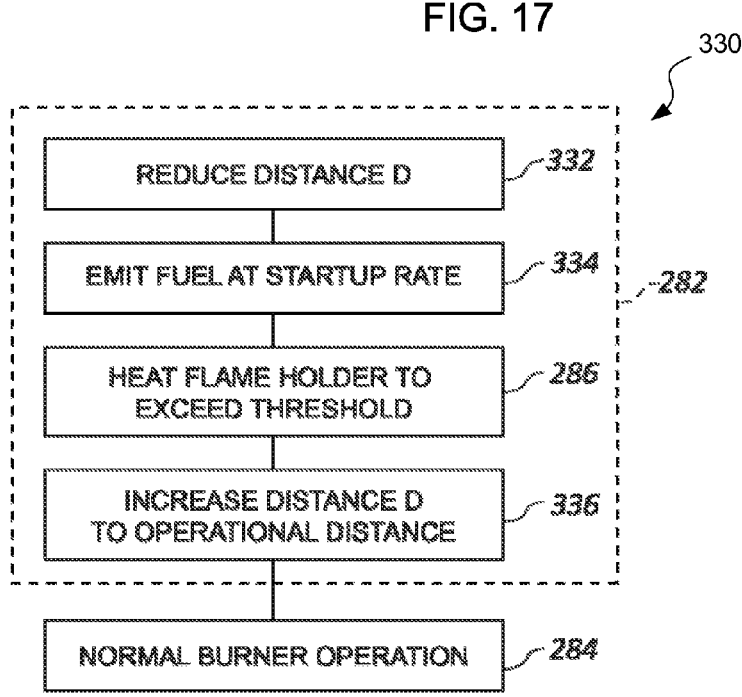

FIG. 17 illustrates a method 330 that is directed in more detail to a method corresponding, for example, to the structure described with reference to FIGS. 2A and 2B, in a distance D between a nozzle and flame holder is reduced (step 332), fuel is emitted from a nozzle at a rate selected to support a startup flame (step 334) and to heat the flame holder (step 286) following which the distance D is increased to an operational distance (step 336).

Figure 18:
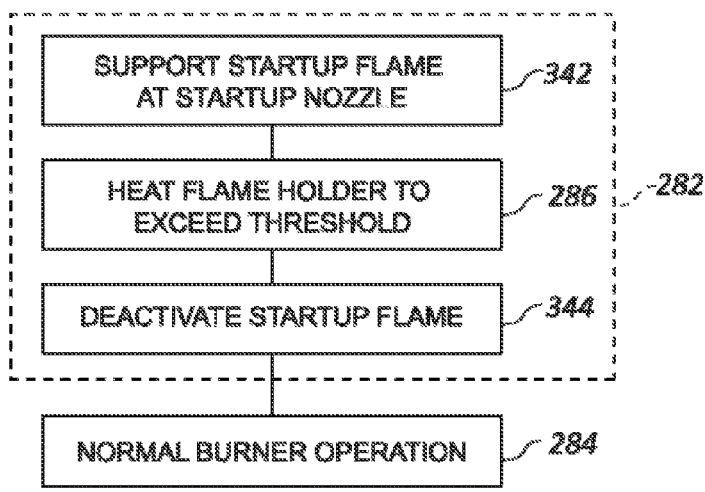

FIG. 18 illustrates a method 340 that is directed in more detail to a method corresponding, for example, to the structure described with reference to FIG. 4, in which a startup nozzle is configured to support a startup flame (step 342) and is positioned adjacent to the flame holder so as to heat the flame holder (step 286). The startup flame of FIG. 4 is deactivated after the flame holder is heated (step 344).

Structures configured to electrically connect components or assemblies shown in the drawings are depicted generically as connectors 144, inasmuch as electrical connectors and corresponding structures are very well known in the art, and equivalent connections can be made using any of a very wide range of different types of structures. The connectors 144 can be configured to carry high-voltage signals, data, control logic, etc., and can include a single conductor or multiple separately-insulated conductors. Additionally, where a voltage potential, control signal, feedback signal, etc., is transmitted via intervening circuits or structures, such as, for example, for the purpose of amplification, detection, modification, filtration, rectification, etc., such intervening structures are considered to be incorporated as part of the respective connector. Where other methods of signal or data transmission are used, such as via, e.g., fiber optics or wireless systems, such alternative structures are considered to be equivalent to the connectors 144 depicted here.

The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A burner, comprising:
    a primary nozzle having a longitudinal axis and configured to emit a fuel flow;
    a primary flame holder having first and second faces and a plurality of apertures extending through the flame holder from the first face to the second face, positioned with the first face toward the nozzle and intersecting the longitudinal axis of the nozzle;
    the primary nozzle and the primary flame holder being separated by a distance D1 in an operational mode wherein an operational flame is primarily within the apertures of the primary flame holder; and
    a preheat mechanism configured to preheat the primary flame holder in a startup mode and not to preheat the primary flame holder in the operational mode,
    the preheat mechanism being configured to support a preheat flame in a position between the primary nozzle and the first face of the primary flame holder.

2. The burner of claim 1, wherein the preheat mechanism includes a secondary flame holder selectively in contact with the fuel flow and configured to support the preheat flame at a position between the primary nozzle and the first face of the primary flame holder.

3. The burner of claim 2, including first and second electrodes configured to apply electrical energy to the flame.

4. The burner of claim 3, wherein one of the first and second electrodes is integral with the primary nozzle.

5. The burner of claim 3, wherein one of the first and second electrodes is integral with the secondary flame holder.

6. The burner of claim 3, wherein one of the first and second electrodes is movable between an extended position and a retracted position.

7. The burner of claim 2, wherein the secondary flame holder is configured to introduce turbulence into the fuel flow emitted by the nozzle.

8. The burner of claim 7, wherein the secondary flame holder is movable between an operative position, in which the secondary flame holder introduces turbulence into the fuel flow, and an inoperative position, in which the secondary flame holder is spaced away from a path of the fuel flow.

9. The burner of claim 7, wherein the preheat mechanism includes a mechanism configured to move the secondary flame holder between the operative and inoperative positions.

10. The burner of claim 2, wherein the secondary flame holder has a toroid shape.

11. The burner of claim 1, wherein D1 is variable and the primary nozzle is movable between a preheat position and an operative position.

12. The burner of claim 11, wherein the preheat mechanism includes a mechanism configured to move the primary nozzle between the preheat position and the operative position.

13. The burner of claim 1, wherein the preheat mechanism includes a control unit to control a transition between the startup mode and the operational mode.

14. The burner of claim 13, wherein the control unit initiates combustion in the apertures of the primary flame holder during the transition.

15. The burner of claim 3,
    wherein the preheat mechanism includes a control unit to control a transition between the startup mode and the operational mode, and
    wherein the control unit controls voltage applied to the first and second electrodes.

16. The burner of claim 1, wherein the distance D1 is such that a fuel-to-air ratio of the fuel flow at the first face of the primary flame holder is leaner than could be maintained without the primary flame holder.

* * * * *